United States Patent
Winniczuk

(10) Patent No.: US 8,420,142 B2
(45) Date of Patent: Apr. 16, 2013

(54) FOOD AND BEVERAGE PRESERVATIVE

(75) Inventor: Paul Winniczuk, Aurburndale, FL (US)

(73) Assignee: LANXESS Corporation, Pittsburgh, PA (US)

( * ) Notice: Subject to any disclaimer, the term of this patent is extended or adjusted under 35 U.S.C. 154(b) by 16 days.

(21) Appl. No.: 12/573,978

(22) Filed: Oct. 6, 2009

(65) Prior Publication Data

US 2010/0068372 A1    Mar. 18, 2010

Related U.S. Application Data

(63) Continuation of application No. 12/105,416, filed on Apr. 18, 2008, now abandoned, which is a continuation of application No. 11/749,255, filed on May 16, 2007, now abandoned, which is a continuation-in-part of application No. 10/662,774, filed on Sep. 15, 2003, now Pat. No. 7,258, 883.

(60) Provisional application No. 60/447,592, filed on Feb. 14, 2003.

(51) Int. Cl.
  *A23L 3/00*    (2006.01)

(52) U.S. Cl.
  USPC .......... 426/321; 426/330; 426/580; 426/590; 426/654

(58) Field of Classification Search ............... 426/321, 426/330, 330.3, 330.4, 330.5, 541, 580, 583, 426/590, 591, 592, 593, 594, 595, 596, 597, 426/598, 599
See application file for complete search history.

(56) References Cited

U.S. PATENT DOCUMENTS 5,843,215 A * 12/1998 Whalon et al. ............. 106/18.29
6,586,029 B1 * 7/2003 Iverson et al. ................ 426/302

* cited by examiner

*Primary Examiner* — Leslie Wong
(74) *Attorney, Agent, or Firm* — Nicanor A. Kohncke

(57) ABSTRACT

Non-toxic, naturally derived, preservative compositions for beverage products, food products and other consumer products which include d-limonene, natural wax and monohydric alcohol are provided. Methods for manufacturing such preservative compositions are also provided. In addition beverage products, food products and other consumer products which include preservative compositions comprising d-limonene, natural wax and monohydric alcohol are provided.

16 Claims, No Drawings

FOOD AND BEVERAGE PRESERVATIVE

CROSS REFERENCE APPLICATIONS

This application is a continuation of U.S. application Ser. No. 12/105,416 filed Apr. 18, 2008, now abandoned, which is a continuation of U.S. application Ser. No. 11/749,255, filed May 16, 2007, now abandoned, which is a continuation in part of U.S. application Ser. No. 10/662,774, filed Sep. 15, 2003, now U.S. Pat. No. 7,258,883, which claims the benefit of U.S. Provisional Application No. 60/447,592, filed Feb. 14, 2003.

FIELD OF THE INVENTION

The present invention relates to preservatives formulated to reduce growth of microbial contaminants such as bacteria and spores that cause spoilage of food, beverages and other goods. This application also relates to synergistic combinations of antimicrobial ingredients that can be used in food and beverages without imparting off-flavors.

BACKGROUND OF THE INVENTION

Bacteria and other microbial organisms cause food and beverage products as well as other products to spoil thereby reducing the shelf life or useful life of such products or goods. Thus, numerous efforts have been made to reduce the deleterious effects of microbial contaminants in food and beverage products and other materials. Previous food and beverage preservative compositions include non-food grade ingredients such as wax paper used as a source of cellulose fiber. Unfortunately, wax paper generally contains bleaches and whiteners that have been shown to be potentially toxic by various LD 50 toxicity tests. Other chemical preservatives can likewise cause adverse side effects when consumed. Thus, many existing preservatives must be regulated and have legally imposed upper limits on usage. In addition, many preservatives, such as sodium benzoate, proprionates, aromatic benzenes, organic acids, propylene glycol and glycerol, for example, when used at levels sufficient for antimicrobial effects, impart an unpleasant taste on the beverage or food, masking or altering to some degree the taste expected by the consumer.

Other food preservatives such as salt and vinegar have been used for generations and while relatively safe to use, their preservative effect is limited in both duration of effect and the types of food and beverages for which they can be used. In addition, at higher levels, preservatives such as salt and vinegar can effect the taste of the product.

Accordingly, a great need exists for effective, relatively inexpensive, non-toxic, naturally derived preservative compositions that are capable of reducing microbial contamination and concomitant spoilage in a wide range of food, beverages and other consumer goods, but without appreciably altering the taste or function of the product.

SUMMARY OF THE INVENTION

The present invention relates to preservative compositions formulated to reduce growth of contaminants such as bacteria, mold, yeast and spores that cause spoilage of food, beverages and other goods. The preservative compositions of the present invention include combinations of beeswax, d-limonene and monohydric alcohol. Applicants have unexpectedly found that this and similar combinations of ingredients provide compositions that are capable of preserving food and beverage products and other consumer products for long periods of time, significantly exceeding the time provided by preservative compositions containing just one of these ingredients. In addition, preservative compositions according to the present invention do not appreciably interfere with the taste of beverage and food products and do not interfere with the function of other consumer products.

Further, since compositions according to the present invention avoid the use of toxic chemicals or chemicals at toxic levels, there are fewer regulatory limitations for the use of such compositions in food or beverages. Also, without the problem of toxicity, concentrations of preservatives according to the present invention can be increased or decreased to accommodate the amount of liquid in a particular product.

The present invention also provides methods of manufacturing such preservative compositions. In one embodiment, a method of this invention includes the steps of (1) heating water; (2) adding monohydric alcohol to the water and mixing; (3) adding d-limonene to the mixture and mixing further; (4) adding beeswax to the mixture and mixing further; (5) optionally filtering the mixture; and; (6) optionally cooling the mixture.

Accordingly, one object of the present invention is to provide preservative compositions for beverage products comprising various combinations of beeswax, d-limonene, and monohydric alcohol.

Another object of the present invention is to provide preservative compositions for food products comprising various combinations of beeswax, d-limonene, and monohydric alcohol.

A further object of the present invention is to provide preservative compositions for a large variety of consumer products comprising various combinations of beeswax, d-limonene, and monohydric.

Another object of the invention is to provide beverage products comprising preservative compositions which comprise various combinations of beeswax, d-limonene, and monohydric alcohol.

An additional object of the invention is to provide food products comprising preservative compositions which comprise various combinations of beeswax, d-limonene, and monohydric alcohol.

Yet another object of the invention is to provide a large variety of consumer products comprising preservative compositions which comprise various combinations of beeswax, d-limonene, and monohydric alcohol.

Another object of the invention is to provide methods of making preservative compositions for beverages, food and other consumer products, the preservative compositions comprising various combinations of beeswax, d-limonene, and monohydric alcohol.

And a further object of the invention is to provide methods of making beverage products, food products and other consumer products comprising preservative compositions which comprise various combinations of beeswax, d-limonene, and monohydric alcohol.

DETAILED DESCRIPTION OF THE INVENTION

The present invention provides non-toxic, naturally derived preservative compositions formulated to reduce growth of microbial contaminants such as bacteria (both gram positive and gram negative), mold, yeast and spores that cause spoilage in various beverage products, food products and other consumer products.

The preservative compositions of the present invention may comprise beeswax, d-limonene, and monohydric alcohol. Applicants have unexpectedly found that this and similar combinations of ingredients provide compositions that are capable of preserving food and beverage products and other products for long periods of time, significantly exceeding the time provided by preservative compositions containing just one of these ingredients. Importantly, these preservative compositions are effective without appreciably altering the taste of the beverage or food product and without altering the function of other consumer products.

As used herein, unless otherwise stated, percentage amounts of an ingredient are by total weight of the preservative composition in which that ingredient is included.

Preservative compositions of the present invention may include wax material. The preferred wax material is beeswax. Beeswax may comprise from about 0.005 to about 10.0%, preferably from about 0.1 to about 5.0%, and more preferably from about 1.0 to about 2.0% and even more preferably about 1.5% of the preservative composition. Optionally, as a substitute for, or in addition to beeswax, the preservative compositions of the present invention may include benzoic acid, salicylic acid and/or paraffin, alone or in various combinations, in amounts by weight totaling those given above for beeswax alone. Beeswax, benzoic acid, salicylic acid and paraffin are commercially available from many sources.

Preservative compositions of the present invention may also include d-limonene. D-limonene is the major component of the oil extracted from citrus rind. D-limonene has been used extensively as an ingredient in cleaning products. D-limonene in preservative compositions of the present invention may comprise from about 0.5% to about 20.0%, preferably from about 5.0% to about 15.0%, and more preferably from about 9.0% to about 11.0%. D-limonene is commercially available from many sources.

Preservative compositions of the present invention also may include monohydric alcohols such as methanol, ethanol and butanol, alone or in various combinations. Non aromatic monohydric alcohols are preferred since they minimize the potential off flavor effects caused by benzene ring based molecules. A preferred monohydric alcohol is ethanol. A preferred combination of monohydric alcohols includes ethanol and methanol. Monohydric alcohols according to the present invention may be either denatured or non-denatured. The monohydric alcohol may comprise from about 0.5% to about 15.0%, more preferably about 2.0 to about 12.0%, and even more preferably from about 4.0 to about 9.0% of the preservative composition. Monohydric alcohols are commercially available from many sources.

Compositions of the present invention also may include other excipients. Other excipients may include potassium hydroxide, xanthan gum, and hydrochloric acid. Potassium hydroxide and hydrochloric acid may be used to control and adjust pH levels. Xanthan gum may be used to control and adjust viscosity and also provide product stability. When included in preservative compositions according to the present invention, potassium hydroxide may comprise from about 0.01 to about 5.0%, more preferably from about 0.05% to about 2.0%, and even more preferably from about 0.1 to about 0.5% of the preservative composition. When included in preservative compositions according to the present invention, xanthan gum may comprise from about 0.01 to about 1.0%, preferably from about 0.01 to about 1.0%, and more preferably from about 0.1 to about 0.5% of the preservative composition. The preservative compositions of the present invention may also include aqueous extracts from citrus leaves. The balance of the composition may comprise water. The water is preferably purified and preferably has a bacterial colony count of less than about 100 colonies per ml. The amount of water used may be varied based on the desired concentration of the preservative. The water may be made alkaline by the addition of potassium hydroxide and preferably has a pH above about 10.0. The preferred water hardness is less than 1 grain per gallon or less than 50 ppm. These particular combinations of food grade ingredients permit the compositions to be altered or changed depending on the food, beverage or other product to be preserved while adjusting the pH range to suit the food, beverage or other product.

An effective amount of the preservative compositions of the present invention is added to or combined with beverage products, food products and other consumer products. In this context an effective amount means an amount that is sufficient to prevent or reduce microbial contamination and spoilage of beverage, food and other consumer products. Accordingly, an effective amount can vary depending on the type of product being preserved and the length of time preservation is desired. Factors such as pH and/or the potential microbial load are factors to consider when determining what amounts of the preservative to use. In general, however, the preservative compositions of the present invention can comprise up to 5% of the total weight of the beverage, food or other product. Preferably the preservative will comprise up to 3% of total weight and more preferably up to 1% of the total weight of the beverage, food or other product. The preservative compositions will usually comprise at least 0.1% of the weight of the beverage food or other product.

Preservative compositions of the present invention may reduce or eliminate the growth of a wide range of spoilage-causing microorganisms including but not limited to bacteria (both gram positive and gram negative), mold, yeast and spores. For example, such preservative compositions have been very effective in preventing food and beverage spoilage caused by the following yeast species: *Saccharomyces cerevisiae, Zygosaccharomyces rouxii, Zygosaccharomyces baillii,* and *Candida albicans*. Likewise, such compositions have been effective against the molds *Aspergillus niger* and *Penicillium notatum*. In addition, these compositions have been very effective in controlling the growth of bacteria including *Escherichia coli, Leuconostoc citreum,* and *Leuconostoc gelidium*.

The preservative compositions of the present invention may be used to treat many types of beverage products normally susceptible to beverage spoiling microorganisms. For example, such beverages types include, but are not limited to, dilute juice beverages, dairy beverages, calcium fortified beverages, and beverages containing tea solids. Some specific non-limiting examples include orange juice, orange drinks, fruit drinks (e.g., apple, grape, pineapple, pear, peach, grapefruit, cranberry, nectarine, raspberry, blackberry, kiwi, mango, cherry and various combination fruit drinks), acidified soy beverages, acidified milk beverages, and flavored carbonated beverages, including "soft" carbonated beverages.

The present invention also provides novel beverage products comprising preservative compositions described herein.

The preservative compositions of the present invention may be used in many types of food products for both human and animal consumption. These food products include high moisture content, moderate moisture content and low moisture content foods. Some specific non-limiting examples include apple sauce, fruit butters and yogurt. These preservative compositions can also be used in a variety of animal foods and feeds.

The present invention also provides novel human and animal food products comprising preservative compositions described herein.

In addition, such preservative compositions may be added to non food and beverage consumer products including, but not limited to cosmetic and personal care products, cleaning agent products, and other products. Cosmetic and personal care products may include: pigmentation and sun care products; diaper, baby wipe and hand wipe, baby powder and body powder and diaper rash products; nursing pads (for bras); makeup products; tampon, maxipad and pantiliner products; acne prevention and treatment products; facial cleansing, toning and exfoliating products and makeup removal products; facial moisturizing, anti-wrinkle, eye treatment, hand lotion and body lotion products; foot care products; anti-itch products; anti-bacterial, antiseptic, antibiotic and first aid products; bath and shower soap in bar, liquid and gel form and bath salt products; shampoo and hair detangling products; hair mousse, hair gel and hair spray products; anti-perspirant and deodorant products in powder, creme, roll-on, aerosol and stick form; aftershave and shaving lotion products; shaving products in creme, gel, powder and soap forms; depilatory, epilatory and hair bleaching products in creme, wax and powder forms; toothpaste products; mouthwash and mouth rinse products; wig and toupee powder products; shoulder pads; freckle coating products, eye drop products; and contact lens treatment products.

Cleaning agent products may include: laundry detergents, stain removers, and fabric softening products, dish washing products, air fresheners, deodorizing products, bathroom tissues, facial tissues, paper towels, napkin products, cotton swabs, handiwipes, scouring and sponge products, oven cleaning products, toilet cleaning products, tub and shower cleaning products, carpet cleaning products, all purpose cleaning products, and jewelry and metal cleaning products.

In addition to the products listed above, preservatives according to the present invention may be added to or included in the following household products: dust filters, wall paint/wallpaper, toilet seat covers, mold remover, ceramic/bathroom tile laminates, water filters, mattress fillers, cleaning agents for solariums and sun beds, toilet brushes, pet litter, and cutting boards to make these products highly resistant to microbial contamination.

The present invention also provides novel products useful in the animal care and veterinary fields. Preservative compositions according to the present invention may also be added to or included, for example, in the following animal/veterinary products to make these products highly resistant to microbial contamination: sand for bird cages, kitty litter, flea powder, and dry shampoos for animals.

Preservative compositions according to the present invention may also be added to or included in the following products: fungicide/pesticide for agriculture, marine antifoulant, coating for glass and cleaners for industrial food and beverage containers, concrete, ceramics, and tile, to name a few, to make these products highly resistant to microbial contamination.

Accordingly, the present invention also provides novel consumer products (in addition to the beverage and food products described above) comprising the preservative compositions described herein Methods of Making The present invention also provides methods of making the preservative compositions described herein. Such methods may include the steps of (1) adding monohydric alcohol to water and mixing; (2) heating the alcohol and water mixture; (3) adding d-limonene and mixing; (4) heating the monohydric alcohol, d-limonene and water combination; (5) adding wax and mixing further; (6) heating the monohydric alcohol, d-limonene, wax and water mixture; (7) optionally filtering the mixture; and (8) optionally cooling the filtrate.

In another embodiment the method of making preservative compositions includes the steps of (1) adding potassium hydroxide to water and mixing; (2) adding monohydric alcohol (e.g., ethanol) to the water and mixing; (3) heating the potassium hydroxide, alcohol, and water mixture to about 175.degree. F. for five minutes or less; (4) adding d-limonene to the water and mixing, while maintaining the temperature at about 175.degree. F. for about 15 minutes (5) adding beeswax to the water and mixing, while maintaining the temperature at about 170.degree. F. for about 15 minutes; (6) adding xanthan gum and mixing vigorously while allowing the mixture to cool; and (7) filtering the cooled mixture.

It should be noted that the order of steps recited above in embodiments of the present invention may be varied to produce compositions according to the present invention. For example, d-limonene may be added prior to adding monohydric alcohol or beeswax could be added before either d-limonene or monohydric alcohol.

In certain examples of embodiments of the present invention, the water may be heated in any heating step (if the particular method of making the preservative composition includes such) to between about 110.degree. to about 272.degree. F., preferably to between about 130.degree. to about 210.degree. F., and more preferably to between about 165.degree. to about 180 F.

The liquid mixture may then be pumped through filters at a pressure sufficient to effectively collect the preservative composition. The filtering pressure may be from about 5 to about 100 psi, preferably is from about 10 to about 40 psi, and more preferably is about 30 psi. The preservative composition may be cooled before use. Preferably the composition may be cooled to at least about 95.degree. F. Cooling may be facilitated by the use of a heat exchanger.

Preservative compositions according to the present invention may also be formed into a crystalline powder form to facilitate packaging and use. This may be achieved, for example, by reducing the water content to about 10% of the composition, adding xanthan gum and gum arabic in roughly equal amounts, drying the composition, and then grinding to break up larger particles. Drying may be achieved by, for example, a vacuum drier, a fluidized bed drier, a low temperature roller drier, a vacuum extrusion drier or by other drying means.

In another embodiment, the preservative composition may also include an aqueous extract from citrus leaves from, for example *Citrus sinensis, Citrus paradisi, Citrus aurantium* and/or *Citrus reticulata* or any combination thereof. The preservative composition may further comprise d-limonene and beeswax and/or antimicrobial compounds extracted from beeswax. A monohydric alcohol such as ethanol may be used as an adjunct in the extraction process.

To manufacture, citrus leaves are collected from citrus trees (e.g., *Citrus sinensis, Citrus paradisi, Citrus aurantium* and *Citrus reticulata*). The leaves may be washed or rinsed to remove insects, debris and compounds associated with the care of the tree. A mild detergent may be used to aid the removal of debris and growing compounds. If a detergent is used, the leaves should be rinsed with potable water to remove detergent residue.

After washing, the leaves may be finely chopped in a blender or other suitable particle size reduction method. Leaf particles may be reduced to about 1 millimeter in size. The chopped leaves may be soaked in water. Leaf to water ratios can vary depending on the desired concentration of the final antimicrobial composition. The water and leaves may be heated to a temperature of between about 110-210.degree. F., preferably around 160.degree., for about 5 minutes under constant agitation. After about 5 minutes, monohydric alcohol may be added to the heated mixture and agitated for about 5 minutes at a temperature between about 110-210.degree. F., preferably about 160.degree. F. The d-limonene may then be added to the heated mixture and may be agitated for about 10 additional minutes.

After the hot soak step, the leaves may be filtered through an approximately 20 mesh stainless steel screen to remove larger leaf particles and fibrous material. The leaf residue may be discarded while the liquid may be then filtered through about a 20 micron filter to remove finer particles. To the filtered liquid, beeswax may be added. The mixture may be reheated to between about 110-210.degree. F., preferably about 165.degree. F., with agitation for about 30 minutes. A final filtration may be done using a filter about 10 microns or less to clarify further the composition further. The filtered material may be discarded while the filtered liquid may be cooled to room temperature and is ready to use in products at diluted rates to achieve the desired goal.

In this embodiment of the present invention, the antimicrobial composition may comprise from about 25% to about 37% citrus leaf extract, from about 1.4% to about 2.1% d-limonene and from about 0.65% to about 1.0% beeswax or antimicrobial compounds extracted from beeswax, all by weight. The monohydric alcohol may comprise from about 2.6% to about 2.8%, preferably from about 3.2% by weight. The balance of the antimicrobial composition is water. In one embodiment, the antimicrobial composition comprises about 31% citrus leaf extract, about 1.7% d-limonene and about 0.84% beeswax, all by weight.

As with the non-citrus leaf extract embodiments, it should be noted that the order of steps in the citrus leaf extract embodiments may be varied to produce compositions according to the present invention. For example, d-limonene may be added prior to adding monohydric alcohol or beeswax could be added before either d-limonene or monohydric alcohol.

As with the non-citrus leaf extract embodiments, the water may be heated in any heating step (if the particular method of making the preservative composition includes such) to between about 110.degree. to about 272.degree. F., preferably to between about 130.degree. to about 210.degree. F., and more preferably to between about 165.degree. to about 180 F.

Also, as with the non-citrus leaf extract embodiments, the liquid mixture may be pumped through filters at a pressure sufficient to effectively collect the preservative composition. The filtering pressure may be from about 5 to about 100 psi, preferably is from about 10 to about 40 psi, and more preferably is about 30 psi. The preservative composition may be cooled before use. Preferably the composition may be cooled to at least about 95.degree. F. Cooling may be facilitated by the use of a heat exchanger.

The citrus leaf extract preservative compositions may also be formed into a crystalline powder form to facilitate packaging and use. This may be achieved, for example, by reducing the water content to about 10% of the composition, adding xanthan gum and gum arabic in roughly equal amounts, drying the composition, and then grinding to break up larger particles. Drying may be achieved by, for example, a vacuum drier, a fluidized bed drier, a low temperature roller drier, a vacuum extrusion drier or by other drying means.

Generally, preservative compositions according to the present invention may be added to the beverage product, food product or other consumer product, such that the preservative composition comprises from about 0.05 to about 5.0% by weight of the food, beverage or other product.

Any method insuring that the preservative compositions of the present invention are incorporated into the beverage, food or other consumer product is suitable. For example, such compositions may be sprayed, injected, dipped or poured directly onto products. Alternatively, preservative compositions may be frozen and products may be placed in contact with the frozen preservative compositions. Further, preservative compositions may be spray dried, freeze-dried and/or powdered and then applied to products. Preservative compositions may be added to a finished product or may be added at any step in the production processes of a beverage, food or other consumer product.

Alternatively, the ingredients of the preservative of the invention as described above can be individually or collectively added to the final product or to what becomes the final product, or in a process of making the final product, either separately or all together at once.

EXAMPLES

Example 1

The composition as shown in Table 1 was used to demonstrate preservative properties of an exemplary embodiment of the present invention:

TABLE 1

| Monohydric alcohol (ethanol) | 6.65% |
| --- | --- |
| d-limonene | 10.00% |
| Beeswax | 1.47% |
| Water | 81.40 |
| Postassium hydroxide | 0.16% |
| Xanthus gum | 0.16% |

The preservative composition of Table 1 is added to orange juice (100% real juice from concentrate, 11.8 brix (acid corrected) and 3.9 pH) at 0.5%, 1% and 2% and inoculated with *Saccharomyces cerevisiae* to the following levels; 30 yeast/ml, 300 y/ml, and 3,000 y/ml. The samples are stored at 30° C. and evaluated for yeast growth and yeast growth by-products. The preservative composition effectively inhibited yeast growth at 0.5% for 21 days, at 1% and 2% for more than 60 days. A control sample containing none of the preservative composition spoiled within 2 days.

Example 2

The preservative composition of Example 1 is added to fruit punch drink (15% real juice, 12.0 brix, 3.0 pH) at 0.25%, 0.5%, 1%, and 2% and inoculated with *Saccharomyces cerevisiae* to the following levels; 50 yeast/ml, 400 y/ml, and 4,000 y/ml. The samples were stored at 30.degree. C. and evaluated for yeast growth and yeast growth by-products. The preservative composition effectively inhibited the yeast growth at 0.25% for 28 days, at 0.5% for more than 30 days, and at 1% and 2% for more than 60 days. A control sample containing none of the preservative composition spoiled within 4 days.

Example 3

The preservative composition of Example 1 is added to grape drink (10% real juice, 12.5 brix, 2.6 pH) at 0.5%, 1%, and 2% and inoculated with *Saccharomyces cerevisiae* to the following levels; 50 yeast/ml and 150 y/ml. The samples were stored at 30.degree. C. and evaluated for yeast growth and yeast growth by-products. The preservative composition effectively inhibited the yeast growth at all levels for more than 70 days. A control sample containing none of the preservative composition spoiled within 4 days.

Example 4

The preservative composition of Example 1 is added to strawberry kiwi flavored drink (0% real juice, 12.0 brix, 3.0 pH) at 0.5% and 1% and inoculated with *Saccharomyces cerevisiae* to the following levels; 50 yeast/ml and 500 y/ml. The samples were stored at 30.degree. C. and evaluated for yeast growth and yeast growth by-products. The preservative composition effectively inhibited the yeast growth at all levels for more than 30 days. A control sample containing none of the preservative composition will spoiled within 4 days.

Example 5

The preservative composition of Example 1 is added to a margherita mix (20% real juice, 60 brix, 1.9 pH) at 1 and 2% and inoculated with *Saccharomyces cerevisiae* to the following levels; 50 yeast/ml and 500 y/ml, The samples were stored at 25.degree. C and evaluated for yeast growth and yeast growth by-products. The preservative composition effectively inhibited the yeast growth at all levels for more than 60 days. A control sample containing none of the preservative composition spoiled within 14 days.

Example 6

The preservative composition of Example 1 is added to a fruit punch beverage syrup (0% real juice, 37 brix, 2.6 pH) at 1 and 2% and inoculated with *Saccharomyces cerevisiae* to the following level; 500 y/ml. The samples are stored at 30.degree. C. and evaluated for yeast growth and yeast growth by-products. The preservative composition effectively inhibited the yeast growth for more than 40 days. When the syrup was diluted 5 fold with water for retail preparation, no yeast growth was seen for more than 30 days at 30.degree. C. A control sample containing none of the preservative composition spoiled within 10 days.

What is claimed is:

1. A food and beverage preservative additive composition comprising from about 0.005 to about 5.0% beeswax, from about 0.5 to about 20% d-limonene, and from about 0.5 to about 15% monohydric alcohol, all by weight.

2. The preservative additive composition of claim 1, wherein the monohydric alcohol is selected from the group consisting of ethanol, methanol and butanol.

3. The preservative additive composition of claim 1, comprising from about 0.1 to 3.0% beeswax, from about 5.0 to about 15% d-limonene and from about 2.0 to about 12% monohydric alcohol, selected from the group consisting of ethanol, methanol and butanol, all by weight.

4. The preservative additive composition of claim 3, wherein said composition comprises from about 1.0 to about 2.0% beeswax, from about 9.0 to about 11.0% d-limonene and from about 4.0 to about 9.0% monohydric alcohol, said monohydric alcohol being selected from the group consisting of ethanol, methanol and butanol, all by weight.

5. The preservative additive composition of claim 4, wherein said composition comprises about 1.3 to about 1.6% beeswax, from about 9.5 to about 10.5% d-limonene, and from about 6.0 to about 7.0% monohydric alcohol, said monohydric alcohol being selected from the group consisting of ethanol, methanol and butanol.

6. The food and beverage preservative additive composition according to claim 1 further comprising: about 0.01 to about 5.0% potassium hydroxide, and from about 0.01 to about 2.0% xanthan gum, all by weight.

7. A composition comprising:
A) a food and beverage preservative additive mixture comprising from about 0.005 to about 5.0% beeswax, from about 0.5 to about 20% d-limonene, and from about 0.5 to about 15% monohydric alcohol, all by weight of said mixture; and
B) a beverage selected from the group consisting of a dilute juice beverage, a dairy beverage, a calcium fortified beverage, and a tea solids containing beverage
wherein said food and beverage preservative additive mixture is present in an amount of less than 5% by weight of the composition.

8. The composition of claim 7, wherein said beverage is selected from the group consisting of orange juice, orange beverage, apple fruit beverage, grape fruit beverage, pineapple fruit beverage, pear fruit beverage, peach fruit beverage, grapefruit fruit beverage, cranberry fruit beverage, nectarine fruit beverage, raspberry fruit beverage, blackberry fruit beverage, kiwi, mango fruit beverage, cherry fruit beverage, combination fruit beverage, acidified soy beverages, acidified milk beverages, and flavored carbonated beverages.

9. The composition of claim 7, wherein the monohydric alcohol is selected from the group consisting of ethanol, methanol and butanol.

10. The composition according to claim 7, wherein the food and beverage preservative additive mixture comprises from about 0.1 to 3.0% beeswax, from about 5.0 to about 15% d-limonene and from about 2.0 to about 12% monohydric alcohol, selected from the group consisting of ethanol, methanol and butanol, all by weight of the mixture.

11. The composition according to claim 7, wherein the food and beverage preservative additive mixture comprises from about 1.0 to about 2.0% beeswax, from about 9.0 to about 11.0% d-limonene and from about 4.0 to about 9.0% monohydric alcohol, selected from the group consisting of ethanol, methanol and butanol, all by weight of the mixture.

12. The composition according to claim 7, wherein the food and beverage preservative additive mixture comprises from about 1.3 to about 1.6% beeswax, from about 9.5 to about 10.5% d-limonene, and from about 6.0 to about 7.0% monohydric alcohol, selected from the group consisting of ethanol, methanol and butanol, all by weight of the mixture.

13. The composition according to claim 7, wherein the food and beverage preservative additive mixture further comprises from about 0.01 to about 5.0% potassium hydroxide, and from about 0.01 to about 2.0% xanthan gum, all by weight of the mixture.

14. The composition according to claim 7, wherein the food and beverage preservative additive mixture is present in an amount of less than 3% by weight of the composition.

15. The composition according to claim 7, wherein said food and beverage preservative additive mixture is present in an amount of less than 1% by weight of the composition.

16. The composition according to claim 7, wherein said food and beverage preservative additive mixture is present in an amount of from 0.01% to less than 3% by weight of the composition.

* * * * *